United States Patent [19]
Minasian

[11] Patent Number: 5,890,907
[45] Date of Patent: Apr. 6, 1999

[54] EDUCATIONAL DOLL

[75] Inventor: David T. Minasian, Wayne, N.J.

[73] Assignee: Clifford W. Estes Company, Inc., Lyndhurst, N.J.

[21] Appl. No.: 6,540

[22] Filed: Jan. 13, 1998

Related U.S. Application Data

[60] Provisional application No. 60/035,108 Jan. 13, 1997.

[51] Int. Cl.⁶ .............................. G09B 19/00; A63H 3/24
[52] U.S. Cl. .......................... 434/247; 446/296; 446/304; 434/262
[58] Field of Search ................................... 434/247, 262, 434/267, 268, 127; 446/296, 304, 305, 472, 295, 475, 330, 320

[56] References Cited

U.S. PATENT DOCUMENTS

| | | | |
|---|---|---|---|
| 2,555,107 | 5/1951 | Beebe | 446/305 |
| 3,562,153 | 2/1971 | Tully . | |
| 3,592,679 | 7/1971 | Tully . | |
| 3,775,901 | 12/1973 | Ellman . | |
| 3,973,510 | 8/1976 | McCulloch . | |
| 4,192,092 | 3/1980 | Goldfarb et al. | 446/304 |
| 4,394,452 | 7/1983 | Hartl et al. | 436/66 |
| 4,413,441 | 11/1983 | Hunter | 446/305 |
| 4,443,200 | 4/1984 | Murphy . | |
| 4,504,241 | 3/1985 | Dyson . | |
| 4,565,536 | 1/1986 | Vairo | 446/304 |
| 5,083,962 | 1/1992 | Procas . | |
| 5,353,449 | 10/1994 | Rubenstein et al. | 4/661 |
| 5,363,516 | 11/1994 | Butts | 4/661 |
| 5,509,808 | 4/1996 | Bell . | |
| 5,713,778 | 2/1998 | Radosevich et al. | 446/304 |

*Primary Examiner*—Robert A. Hafer
*Assistant Examiner*—Michael B. Priddy
*Attorney, Agent, or Firm*—McCarter & English L.L.P.; Allen N. Friedman

[57] ABSTRACT

An educational doll, useful to teach toilet training to young children, dispenses measured portions of superhydrophobic sand into water, perhaps contained in a transparent commode, scaled to the size of the doll. The superhydrophobic sand collects on the bottom of the commode as a cohesive mass, simulating a bowel movement. The sand can be dyed brown to enhance the visual image imparted to the child. The commode can be equipped with a trap door to simulate flushing of the toilet. When the water is drained away, the sand will be dry because of its superhydrophobic property, thus, easy to handle and reuse.

9 Claims, 3 Drawing Sheets

FIG. 3
FIG. 4
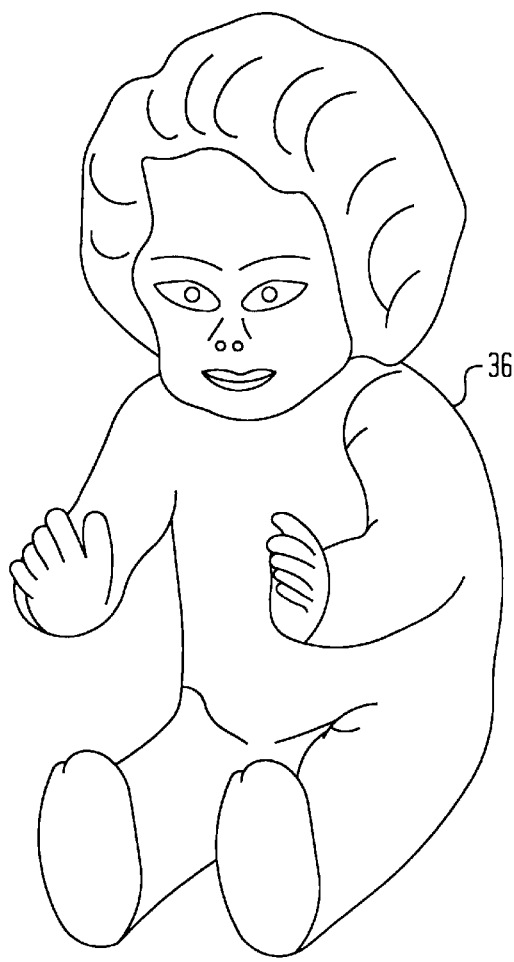
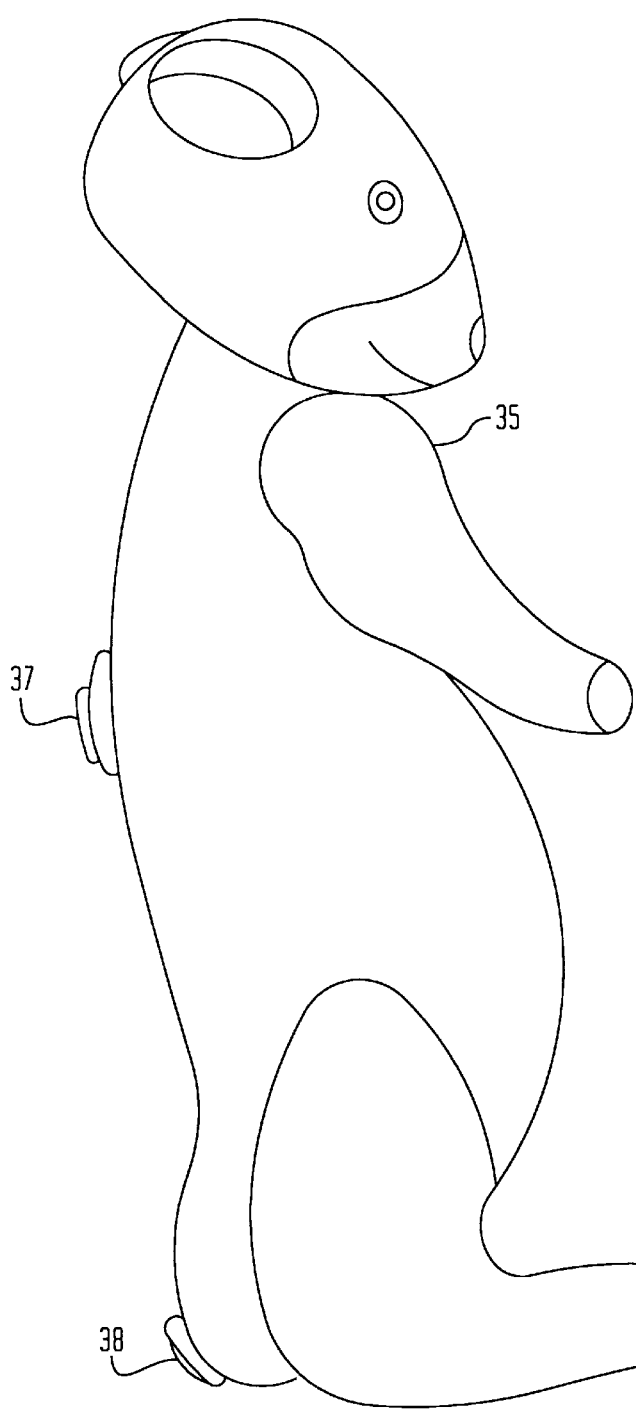

EDUCATIONAL DOLL

This application claims benefit of Provisional Application Ser. No. 60/035,108, filed Jan. 13, 1997.

BACKGROUND OF THE INVENTION

1. Field of the Invention

The invention is in the field of educational aids in the toilet training of young children.

2. Background Art

Toilet training of young children is of continuing concern to parents and the object of a body of educational technology aimed at aiding this learning process. This technology includes a body of children's literature and audio visual materials graphically illustrating the natural bodily functions of urination and defecation. Patented technology includes an assortment of animal and human dolls that are equipped to emit water and soft solids into potties to illustrate to the child the appropriateness of elimination into a toilet.

A doll that wets automatically when it is positioned to be set on a toilet is disclosed in U.S. Pat. No. 4,413,441, issued Nov. 8, 1983. A toilet training kit disclosed in U.S. Pat. No. 5,509,808, issued Feb. 14, 1994 includes a wetting doll and a miniature toilet equipped to accommodate sheets of material that dissolves when the doll emits water into the toilet. The doll disclosed in U.S. Pat. No. 5,083,962, issued Jan. 28, 1992 is equipped to illustrate the entire digestive process, from ingestion of solids and liquids to ejection of these materials into a potty. U.S. Pat. No. 4,443,200, issued Apr. 7, 1984 discloses an animal figure equipped to emit liquid from an anterior port and a soft material such as a clay or craft dough from a posterior port when the front or rear of the figure is squeezed.

All of the above prior art devices attempt in one way or another to approach the real experience of the child contemplating use of the toilet. However, none of them include the visual impression of seeing a stool dropping into water, as is a very real part of the toilet training experience. One reason this may be true in the difficulty of handling and drying the simulated stool for reuse in the doll.

SUMMARY OF THE INVENTION

The above problem is solved through exploiting the unique properties of superhydrophobic sand. This material does not become wet when poured into water. The highly water repellant nature of the coating on each grain of sand prevents water from penetrating the sand mass and displacing the entrapped air. Consequently, when dropped into a toy toilet, containing water, the sand appears to turn instantly into a cohesive pile at the bottom.

Through use of the herein disclosed invention, an educational doll, useful to teach toilet training to young children, dispenses measured portions of superhydrophobic sand into water, perhaps contained in a transparent commode, scaled to the size of the doll. The superhydrophobic sand collects on the bottom of the commode as a cohesive mass, simulating a bowel movement. The sand can be dyed brown to enhance the visual image imparted to the child. The commode can be equipped with a trap door to simulate flushing of the toilet. When the water is drained away, the sand will be dry because of its superhydrophobic property, thus, easy to handle and reuse.

BRIEF DESCRIPTION OF THE DRAWINGS

FIG. 3 is a side view of a representative animal doll figure.

FIG. 4 is a perspective view of a representative human doll figure.

DETAILED DESCRIPTION OF THE INVENTION

The Material

Figure 1:
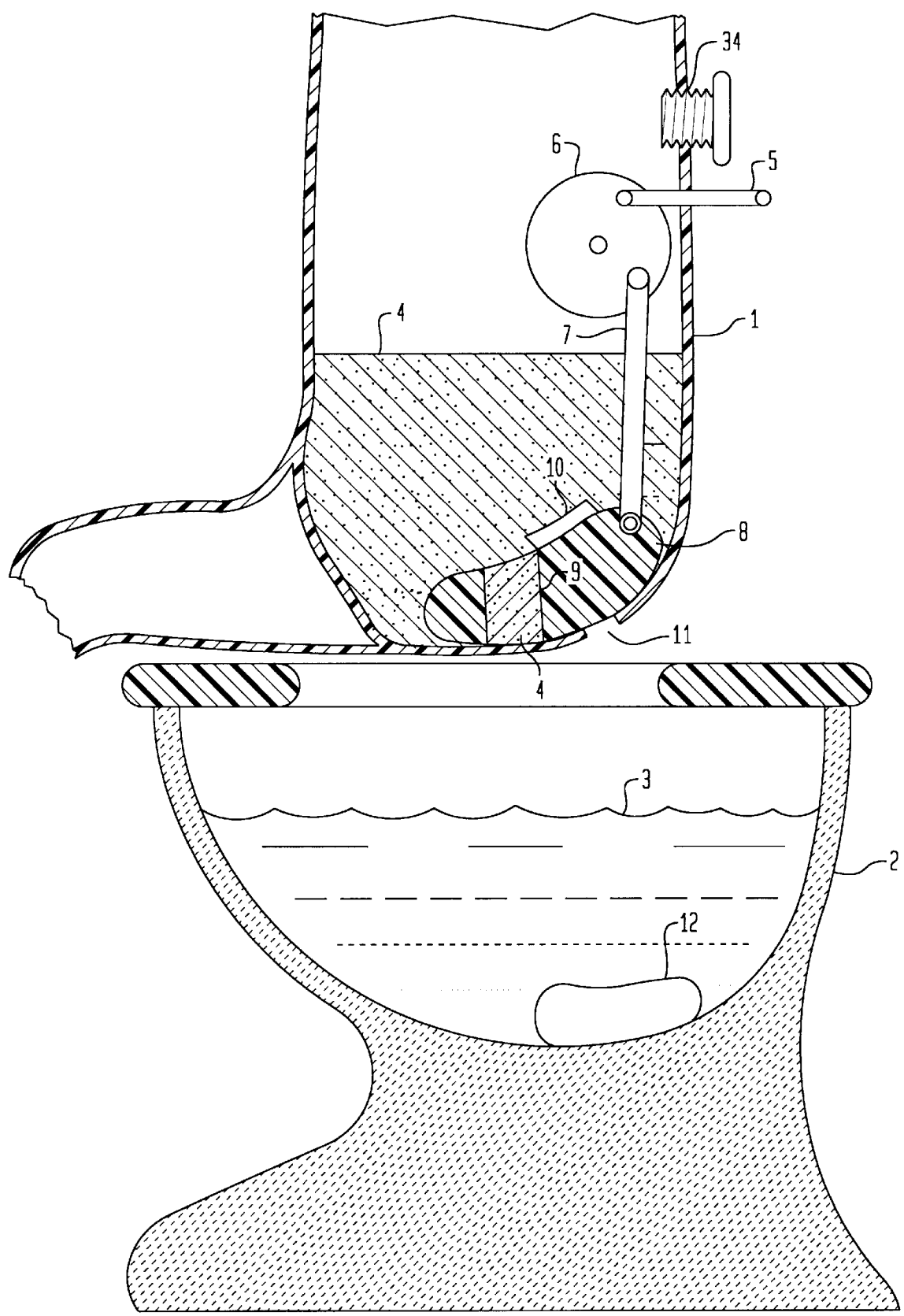
FIG. 1 is a side view, in section of a representational figure and toilet of the invention.

Superhydrophobic sand has been commercially available since the late 1970's from the Clifford W. Estes Company. It has been used for a variety of crafts and toys and in aquariums. This material consists of sand, the grains of which are coated with much finer submicron silica particles that have been surface treated for water repellency as taught in U.S. Pat. No. 3,592,679, issued Jul. 13, 1971. Submicron silica powders are available commercially, for example, under the trade name Cabosil from the Cabot Corporation of Boston, Mass. Such fine silica powders, surface treated with hexamethyldisilizane are available commercially from Tulco Corp. of Ayer, Mass. under the trade name Tullannox. The above mentioned patent teaches other applicable material systems and alternate methods of applying these surface treated particles to broader surfaces in order to produce water repellency.

The sand particles employed are primarily in the 100 to 500 micron diameter range, i.e., 20 to 70 mesh, but preferably 30 to 60 mesh (using ASTM standard mesh designations). When the treated submicron particles are coated on the much larger sand grains, by one of a variety of methods disclosed in the above patent and otherwise known in the art, they prevent water from reaching the surface of the sand grain (superhydrophobicity) and maintain an air layer between the sand grain surface and the water. When under water, a pile of coated sand grains will remain dry within an air bubble and will be held together by the pressure of the surrounding water. Since the water never touches the sand surface, the sand is dry when the water is drained away. The sand can be colored brown to enhance the visual image.

The commercially available superhydrophobic sand uses approximately 30 pounds of treated submicron powders per ton of coated sand. For the purposes of the herein disclosed usage, it may prove advantageous to reduce the thickness of the air layer by reducing the amount of treated submicron power to the range of 10 to 1 pound per ton, preferably approximately 10 pounds per ton.

Doll and Commode

The educational doll, employing the unique properties of superhydrophobic sand to teach toilet training is designed to allow the discharge of a small quantity of appropriately colored sand from the doll's buttock area into a miniature toilet to simulate the bowel movement. The design of the doll provides a storage reservoir of sand and a port for replenishing the reserve supply of sand. The discharge gate is actuated by a button or lever. Preferably, a metering device is included to measure a finite sand portion to be discharged each time the button or lever is actuated.

The water container into which the sand portions are discharged is, preferably, shaped like a miniature toilet, sized appropriately for the doll. In order to enhance the educational impact, it is, preferably, transparent. Depending on the level of detail desired, the miniature toilet could be designed with a trap door to "flush" the water and sand into a lower waste chamber and a water reservoir to refill the toilet bowl.

FIG. 1 shows, in a highly representational way a doll body section 1, in a seated position over a commode 2 containing a quantity of water 3. The doll's body holds a reservoir of sand 4. When lever 5 is pushed into the doll, wheel 6 rotates and draws up arm 7. Arm 7 is attached to a slide 8 with a cavity 9 open at top and bottom. In the illustrated position, the cavity 9 is filled with a measured portion of sand 4 from the reservoir. When the lever 5 is pushed in, the slide 8 is drawn up behind gate 10, placing the cavity 9 opposite the doll's anal opening 11 and permitting the sudden discharge of sand in the cavity 9. A previously discharged portion 12 of sand is shown held together by water pressure as a cohesive lump. Withdrawal of the lever 5 from the doll, permits refilling of the cavity 9. Gate 10 prevents a direct drainage of sand from the reservoir 4 into the toilet 2. These representationally illustrated structures can be implemented in many ways known to the designers of toy figures.

Figure 2:
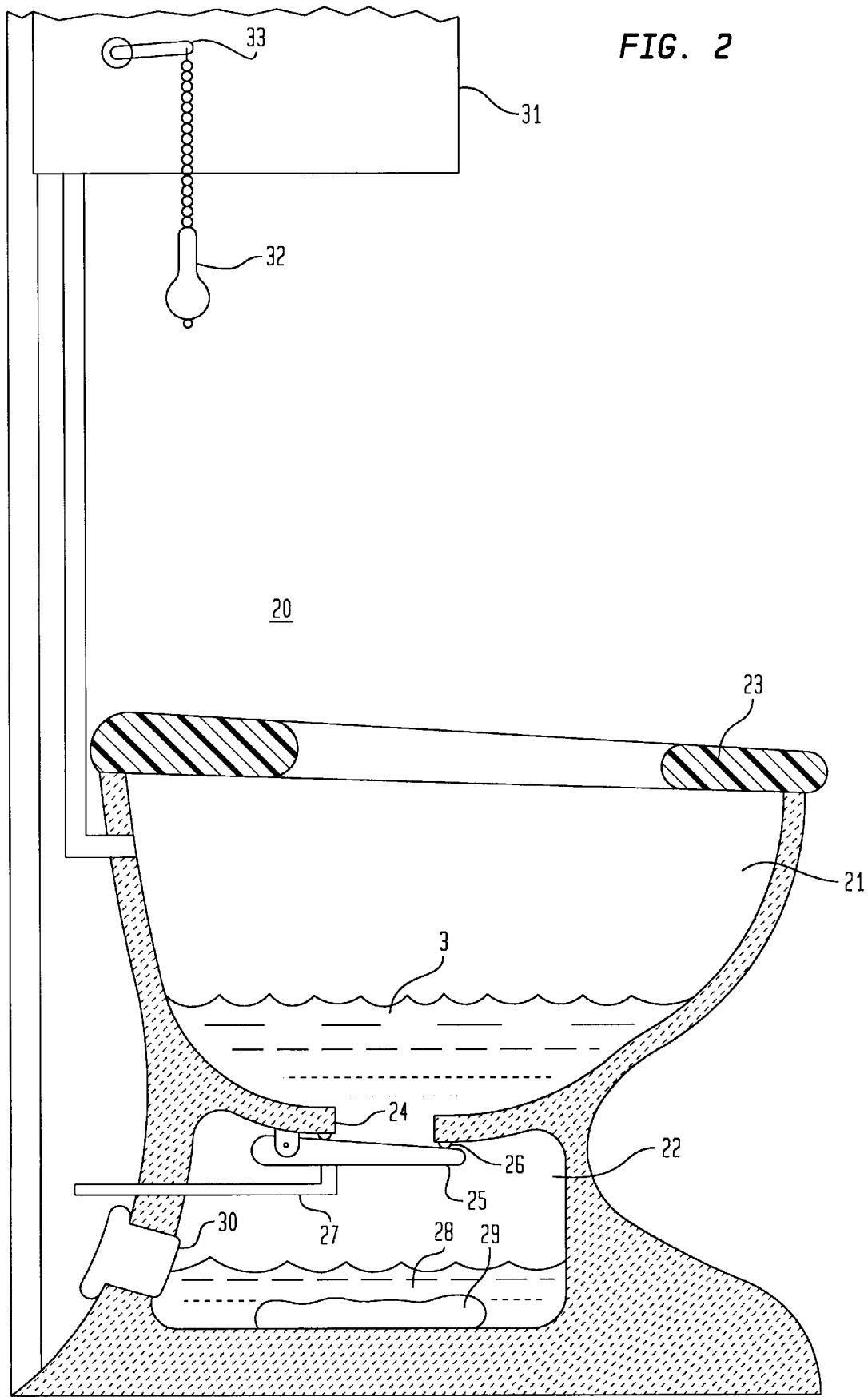
FIG. 2 is a side view, partially in section, of a two chambered toilet of the invention, with a water reservoir.

FIG. 2 shows a two chambered commode 20 in which the upper chamber 21 is open at the top, with perhaps a simulated toilet seat 23, and provided at the bottom with an emptying orifice 24. The emptying orifice 24 is provided with a trap door 25 or equivalent valuing device. The orifice 24 is surrounded by a water sealing element 26, such as a gasket or O-ring to prevent or reduce unwanted leakage of water 26 from the upper chamber 21 to the lower chamber 22. The trap door 25 is operated by an actuator 27, shown in highly schematic form, but implementable in many ways by mechanical, electrochemical or hydraulic lever or push button activated mechanisms known in the art. The commode 20 or at least the walls of the upper chamber 21, can be made of a transparent material to enhance the visual effect.

After a portion of sand has been discharged into the upper chamber 21, the trap door 25 can be opened to "flush" the water and sand into the lower chamber 22. After several flushes the accumulated water 28 and sand 29 can be drained from the lower chamber 22 through the plugged emptying orifice 30. The water is then poured off, leaving dry sand ready for reuse. A measured quantity of water 26 can be replaced from a reservoir 31 by operation of an actuator and water metering device in the reservoir 31. The actuator is illustrated in FIG. 2 by a pull chain 32 and lever 33, representative of many actuator and water metering devices known in the art. In FIG. 1 the invention can be a representational figure in the form of an animal 35, such as shown in FIG. 3, or a human child, such as shown in FIG. 4, depending on the degree of graphic imaging the toy designer desires. The animal doll 35 shows, schematically, a filling orifice 37 (access port) and anal orifice 38 (exit port). Sand 4 can be replenished through a plugged filing orifice 34, or access port.

The dolls used in the herein disclosed invention can be representational figures in the form an animal 35, such as shown in FIG. 3, or a human child, such as shown in FIG. 4, depending on the degree of graphic imagery the toy designer desires. The animal doll 35 shows, schematically, a filling orifice 37 (access port) and anal orifice 38 (exit port).

What is claimed is:

1. An educational doll comprising:

a body member containing a chamber for holding a quantity of superhydrophobic sand, an access port communicating with the chamber, and exit port communicating with the chamber;

a first means for metering a portion of the superhydrophobic sand and discharging the portion through the exit port into a quantity of water contained in a reservoir;

a second means for activating the first means; and a quantity of superhydrophobic sand within the chamber.

2. The doll of claim 1 in which the superhydrophobic sand is brown.

3. A toilet training kit comprising a representational figure with a body member and an anal orifice, the body member containing a chamber for holding a quantity of superhydrophobic sand and means for discharging a measured portion of the superhydrophobic sand through the anal orifice upon operation of an activating means;

a quantity of superhydrophobic sand; and a miniature commode, scaled to the size of the representational figure, for holding a quantity of water and receiving the measured portion of superhydrophobic sand when discharged from the representational figure.

4. A kit of claim 3 in which the representational figure is in the form of a small child.

5. A kit of claim 3 in which the miniature commode is at least partially transparent.

6. A kit in claim 5 in which the commode is equipped with an upper chamber and a lower chamber, a valve between the upper chamber and the lower chamber for emptying the contents of the upper chamber into the lower chamber, and a discharge port for emptying the lower chamber.

7. A kit of claim 6 in which the commode is equipped with a reservoir for discharging a measured quantity of water into the upper chamber.

8. A kit of claim 6 in which the upper chamber is transparent.

9. A kit of claim 3 in which the representational figure is in the form of an animal.

\* \* \* \* \*